United States Patent
Chiang et al.

(10) Patent No.: US 8,947,065 B2
(45) Date of Patent: Feb. 3, 2015

(54) DC-DC CONTROLLER AND CONTROL METHOD THEREOF

(71) Applicant: uPI Semiconductor Corp., Hsinchu County (TW)

(72) Inventors: Chu-Yi Chiang, Hsinchu County (TW); Hua-Chiang Huang, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 0 days.

(21) Appl. No.: 13/798,171

(22) Filed: Mar. 13, 2013

(65) Prior Publication Data

US 2014/0176091 A1    Jun. 26, 2014

(30) Foreign Application Priority Data

Dec. 21, 2012 (TW) .............................. 101149170 A (51) Int. Cl.
G05F 1/00 (2006.01)
H02M 3/158 (2006.01)
H02M 3/156 (2006.01)

(52) U.S. Cl.
CPC ............ *H02M 3/158* (2013.01); *H02M 3/1584* (2013.01); *H02M 2003/1566* (2013.01)
USPC ......................................... 323/288; 323/285

(58) Field of Classification Search
USPC ......... 323/222, 242, 243, 271, 282, 283, 284, 323/285, 288
See application file for complete search history.

(56) References Cited

U.S. PATENT DOCUMENTS

| | | |
|---|---|---|
| 5,406,468 A | 4/1995 | Booth |
| 7,474,086 B2 | 1/2009 | Chen et al. |
| 7,923,977 B2 | 4/2011 | Huang |
| 2009/0153114 A1* | 6/2009 | Huang .......................... 323/282 |
| 2010/0033152 A1* | 2/2010 | Chen et al. .................... 323/288 |
| 2011/0127980 A1* | 6/2011 | Chen et al. .................... 323/282 |

* cited by examiner

*Primary Examiner* — Nguyen Tran
(74) *Attorney, Agent, or Firm* — Jianq Chyun IP Office (57) ABSTRACT

A DC-DC controller and a control method thereof are provided. The DC-DC controller is coupled to an output stage. The output stage receives an input voltage and provides an output voltage. The DC-DC controller includes a transient boost circuit, a ramp oscillator, a combination logic circuit, a first comparator and a pulse width modulation (PWM) generator. The transient boost circuit generates an adjusting signal according to a variation of the output voltage. The combination logic circuit controls the ramp oscillator to generate a ramp signal according to the adjusting signal. The first comparator generates a first signal according to the ramp signal and an outputted feedback voltage related to the output voltage. The PWM generator generates a PWM signal according to the first signal, so as to control the operations of the output stage.

20 Claims, 7 Drawing Sheets

DC-DC CONTROLLER AND CONTROL METHOD THEREOF

CROSS-REFERENCE TO RELATED APPLICATION

This application claims the priority benefit of Taiwan application serial no. 101149170, filed on Dec. 21, 2012. The entirety of the above-mentioned patent application is hereby incorporated by reference herein and made a part of this specification.

TECHNICAL FIELD

The invention relates to a direct current (DC)-DC control technique, and more particularly, to a DC-DC controller and a control method thereof.

BACKGROUND

Figure 1:
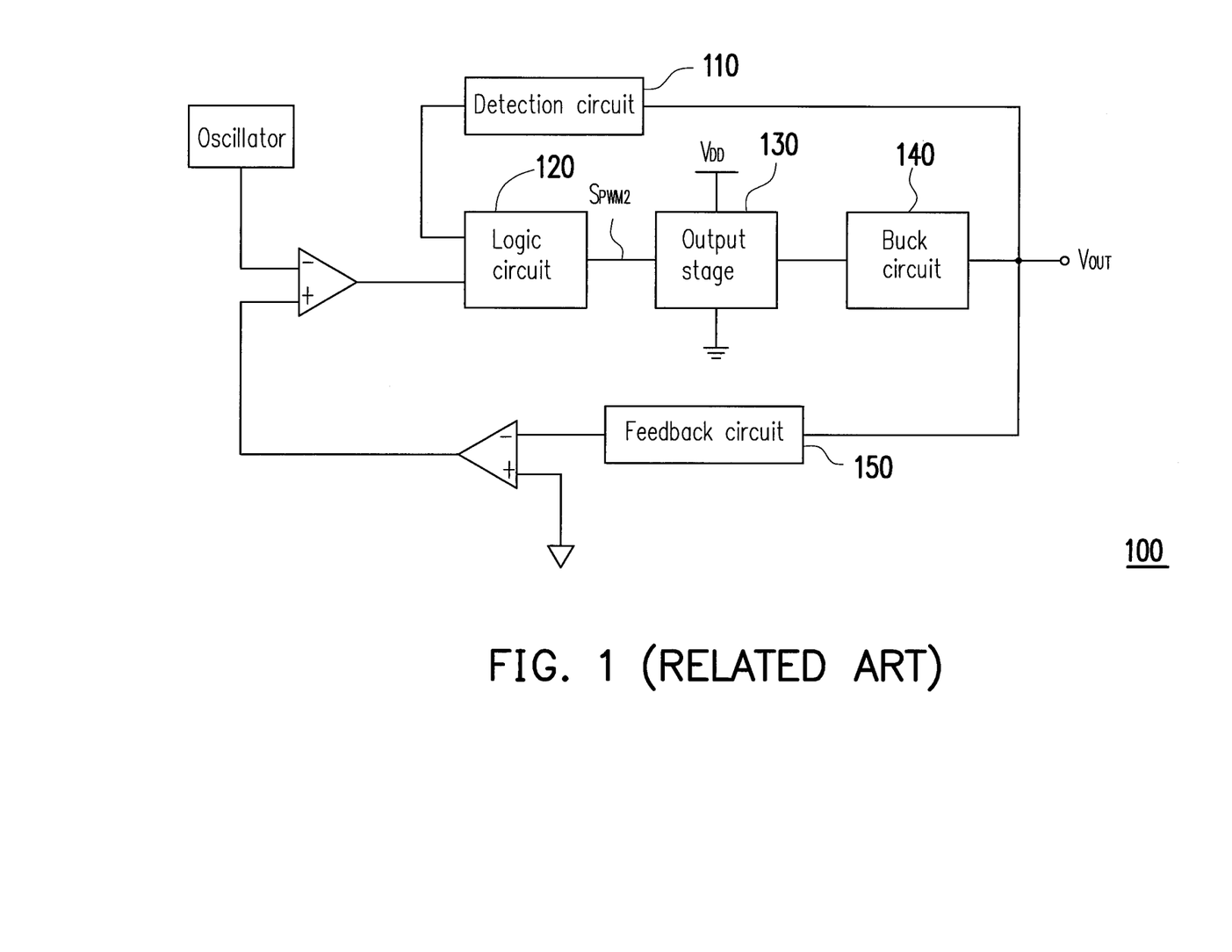
FIG. 1 is a schematic circuit block diagram illustrating a current DC-DC converter.

FIG. 1 is a schematic circuit block diagram illustrating a current DC-DC converter. The DC-DC converter 100 converts an input voltage $V_{DD}$ to an output voltage $V_{OUT}$, and the DC-DC converter 100 includes a detection circuit 110 for detecting the output voltage $V_{OUT}$, in which when the output voltage $V_{OUT}$ having a rapid load transient phenomenon is detected, a logic high level is outputted to a logic circuit 120. Subsequently, according to the logic high level, the logic circuit 120 forces to turn on a metal oxide semiconductor in an output stage 130 and passes through a buck circuit 140 to provide the required current for a load terminal.

The DC-DC converter 100 includes two loops, in which one of the loops is through a feedback circuit 150 while the other one loop is through the detection circuit 110. In the conventional driving method, due to the two loops being applied, the logic circuit 120 forces the output stage 130 to turn on according to the logic high level of the detection circuit 110. Such method affects the output of the feedback circuit 150 becoming less significant. Therefore, the overall method is crude and is also unable to maintain the integrity of the single loop of the feedback circuit 150. Hence, the conventional driving technique can still be improved.

SUMMARY

Accordingly, the invention is directed to a controller, a converter, a multiphase controller and a multiphase converter applying a direct current (DC)-DC technique, so as to solve the issues afore-described in the related art.

The invention provides a DC-DC controller which is coupled to an output stage. The output stage receives an input voltage and provides an output voltage. The DC-DC controller includes a transient boost circuit, a ramp oscillator, a combination logic circuit, a first comparator and a pulse width modulation (PWM) generator. The transient boost circuit generates an adjusting signal according to a variation of the output voltage. The combination logic circuit is coupled to the transient boost circuit, and controls the ramp oscillator to generate a ramp signal according to the adjusting signal. The first comparator is coupled to the combination logic circuit, and generates a first signal according to the ramp signal and an outputted feedback voltage related to the output voltage. The PWM generator is coupled to the first comparator, and generates a PWM signal to control the operation of the output stage according to the first signal.

In an embodiment of the invention, the transient boost circuit includes a compensation adjustment circuit and a second comparator. The compensation adjustment circuit receives the output voltage to generate a transient boost voltage, in which the transient boost voltage has a voltage compensation corresponding to a steady state of the output voltage. The second comparator compares the output voltage and the transient boost voltage to generate the adjusting signal. Moreover, when the transient boost voltage is higher than the output voltage, the adjusting signal has a logic high level, and when the transient boost voltage is lower than the output voltage, the adjusting signal has a logic low level.

In an embodiment of the invention, when the adjusting signal has the logic high level, the combination logic circuit maintains the ramp signal at a first predetermined level, in which the first predetermined level is lower than a level of an error signal related to the output voltage.

In an embodiment of the invention, the compensation adjustment circuit includes a first capacitor, a current source and a resistor. The first capacitor is coupled to a first input terminal of the second comparator, and is configured to maintain the transient boost voltage. The current source is coupled to the first input terminal of the second comparator, and is configured to generate a current. The resistor is coupled between the first input terminal and a second input terminal of the second comparator, and is configured to generate the voltage compensation, in which the resistance of the resistor is multiplied by the current so as to generate the voltage compensation.

In an embodiment of the invention, the transient boost circuit includes a second capacitor and a third comparator. The second capacitor is configured to maintain a transient boost voltage. The third comparator has a first input terminal coupled to the output voltage and a second input terminal coupled to the second capacitor, and has a compensation voltage source between the first input terminal and the second input terminal of the third comparator. The third comparator compares the output voltage and the transient boost voltage to generate the adjusting signal, in which when the transient boost voltage is higher than the output voltage, the adjusting signal has a logic high level, and when the transient boost voltage is lower than the output voltage, the adjusting signal has a logic low level.

The invention provides another DC-DC control method which is configured to employ an output stage to provide an output voltage after receiving an input voltage. The DC-DC control method includes the following steps: generating an adjusting signal according to a variation of the output voltage; providing a ramp signal according to the adjusting signal and an output from a ramp oscillator; generating a first signal according to the ramp signal and an outputted feedback voltage related to the output voltage; and generating a pulse width modulation (PWM) signal to control the operation of the output stage according to the first signal.

In an embodiment of the invention, the step of generating the adjusting signal according to the variation of the output voltage further includes: receiving the output voltage to generate a transient boost voltage, in which the transient boost voltage has a voltage compensation corresponding to a steady state of the output voltage; and comparing the output voltage and the transient boost voltage to generate the adjusting signal.

In an embodiment of the invention, when the transient boost voltage is higher than the output voltage, the adjusting signal has a logic high level, and when the transient boost voltage is lower than the output voltage, the adjusting signal has a logic low level.

In an embodiment of the invention, when the adjusting signal has the logic high level, the step of providing the ramp signal according to the adjusting signal and the output from the ramp oscillator further includes: maintaining the ramp signal at a first predetermined level, in which the first predetermined level is lower than a level of an error signal related to the output voltage.

Based on the above, in the invention, because of employing the detected transient variation of the output voltage to generate the ramp signal, the combination logic circuit provides the ramp signal according to the adjusting signal and the output of the ramp oscillator. When the adjusting signal has the logic high level, the combination logic circuit maintains the ramp signal at the first predetermined level, in which the first predetermined level is lower than the level of the error signal related to the output voltage (for instance, pulling the ramp signal rapidly to zero) and is maintained over a predetermined time. After the predetermined time, when the adjusting signal is returned to the logic low level, the ramp signal is then generated periodically. Thus, the invention is capable of enhancing the transient response and providing the current rapidly. On the other hand, the impact on the closed-loop control of the feedback circuit through the conventional open-loop method can also be avoided, and the integrity of the single-loop control can be maintained.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Detailed reference is made to the embodiments of the present invention and the examples of the embodiments are illustrated in the accompanying drawings. In addition, the elements/members with the same or similar numbers are used in the drawings and implementation manners to represent the same or similar parts.

Figure 2:
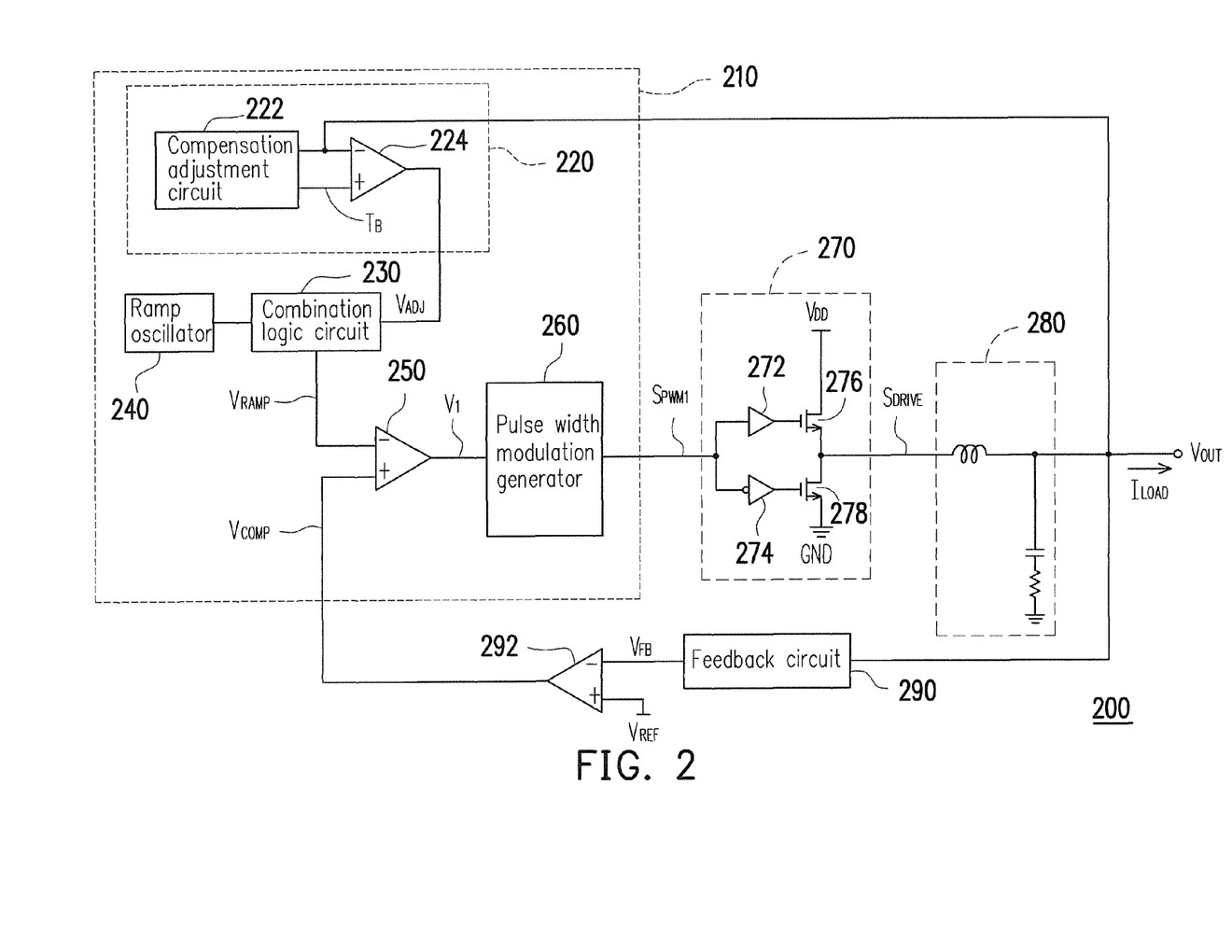
FIG. 2 is a schematic diagram illustrating a single-phase DC-DC converter according to an embodiment of the invention.

FIG. 2 is a schematic diagram illustrating a single-phase direct current (DC)-DC converter according to an embodiment of the invention. Referring to FIG. 2, the single-phase DC-DC converter 200 includes a DC-DC controller 210, an output stage 270, a buck circuit 280, a feedback circuit 290 and an error amplifier 292. The DC-DC converter 200 is applicable to convert an input voltage $V_{DD}$ to an output voltage $V_{OUT}$. Moreover, the DC-DC controller 210 includes a transient boost circuit 220, a combination logic circuit 230, a ramp oscillator 240, a first comparator 250 and a pulse width modulation (PWM) generator 260.

More specifically, the combination logic circuit 230 is coupled to the transient boost circuit 220 and the ramp oscillator 240. The first comparator 250 is coupled to the output of the combination logic circuit 230. The PWM generator 260 is coupled to the output of the first comparator 250. The output stage 270 is coupled to the output of the PWM generator 260. The buck circuit 280 is coupled to the output of the output stage 270.

The feedback circuit 290 includes a plurality of resistors (not shown), in which the resistors are configured to divide the output voltage $V_{OUT}$ and generate a feedback voltage $V_{FB}$. The error amplifier 292 receives the feedback voltage $V_{FB}$ and a reference voltage $V_{REF}$, and generates an error signal $V_{COMP}$ related to the output voltage $V_{OUT}$ (i.e., an outputted feedback voltage).

Figure 3:
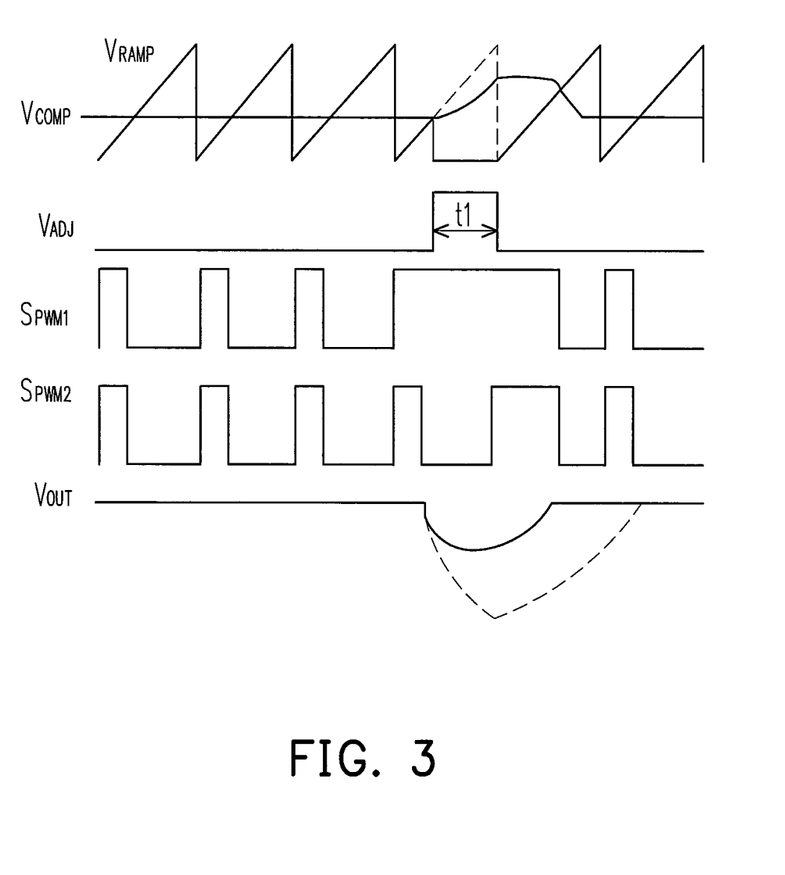
FIG. 3 is a schematic diagram illustrating waveforms under a constant frequency structure according to an embodiment of the invention.

FIG. 3 is a schematic diagram illustrating waveforms under a constant frequency structure according to an embodiment of the invention. Referring to FIG. 2 and FIG. 3 together, the transient boost circuit 220 receives the output voltage $V_{OUT}$ and generates an adjusting signal $V_{ADJ}$ according to a variation of the output voltage $V_{OUT}$, in which indicates a load transient phenomenon being detected when the adjusting signal $V_{ADJ}$ has a logic high level. The combination logic circuit 230 provides a ramp signal $V_{RAMP}$ according to the adjusting signal $V_{ADJ}$ and an output of the ramp oscillator 240, and the waveform of the ramp signal $V_{RAMP}$ may be serrated or triangular. When the adjusting signal $V_{ADJ}$ has the logic high level, the combination logic circuit 230 maintains the ramp signal $V_{RAMP}$ at a first predetermined level, in which the first predetermined level is lower than a level of an error signal $V_{COMP}$ related to the output voltage. For instance, the ramp signal $V_{RAMP}$ is pulled to zero (or is pulled to the lowest), and is maintained in a predetermined time t1. After the predetermined time t1, when the adjusting signal $V_{ADJ}$ is returned to the logic low level, the serrated or triangular ramp signal $V_{RAMP}$ is then generated periodically.

Moreover, the transient boost circuit 220 includes a compensation adjustment circuit 222 and a comparator 224. The compensation adjustment circuit 222 receives the output voltage $V_{OUT}$ and then generates a transient boost voltage $T_B$. The transient boost voltage $T_B$ has a compensation voltage corresponding to the output voltage $V_{OUT}$. A first terminal of the comparator 224 receives the output voltage $V_{OUT}$, and a second terminal of the comparator 224 receives the transient boost voltage $T_B$. The comparator 224 compares the output voltage $V_{OUT}$ and the transient boost voltage $T_B$ to generate the adjusting signal $V_{ADJ}$.

The comparator 250 generates a first signal $V_1$ according to the ramp signal $V_{RAMP}$ and the error signal $V_{COMP}$ related to the output voltage $V_{OUT}$. When the error signal $V_{COMP}$ is higher than the ramp signal $V_{RAMP}$, the first signal $V_1$ generated by the comparator 250 is a pulse having the logic high level. The PWM generator 260 generates a pulse width modulation (PWM) signal $S_{PWM1}$ according to the first signal $V_1$, in which the PWM signal $S_{PWM1}$ is configured to drive the output stage 270. In view of the entire circuit, the utilization of the combination logic circuit 230 is capable of preventing the priority of the adjusting signal $V_{ADJ}$ higher than that of the error signal $V_{COMP}$, so that the control of the DC-DC controller 210 is smoother, and may be controlled by a single-loop.

Subsequently, the output stage 270 converts the input voltage $V_{DD}$ to a driving signal $S_{DRIVE}$ according to the PWM signal $S_{PWM1}$, so that the buck circuit 280 may generate the output voltage $V_{OUT}$ according to the driving signal $S_{DRIVE}$. The output voltage $V_{OUT}$ may be supplied to the load driven by the direct current.

In the embodiment, the output stage may include drivers 272, 274 and N-type metal oxide semiconductor (NMOS) transistors 276, 278. The drivers 272 and 274 receive the PWM signal $S_{PWM1}$ which is converted to a switching signal configured to turn on one of the NMOS transistors 276 and 278. The NMOS transistors 276 and 278 may convert the input voltage $V_{DD}$ to a driving signal $S_{DRIVE}$ according to the switching signal, in which the driving signal $S_{DRIVE}$ is a node voltage located between the metal oxide semiconductor transistors 276 and 278. Therefore, when the metal oxide semiconductor transistors 276 is turned on and the metal oxide semiconductor transistors 278 is turned off, the driving signal $S_{DRIVE}$ is equal to the input voltage $V_{DD}$; and when the metal oxide semiconductor transistors 278 is turned on and the metal oxide semiconductor transistors 276 is turned off, the driving signal $S_{DRIVE}$ is equal to the ground voltage GND.

Figure 4:
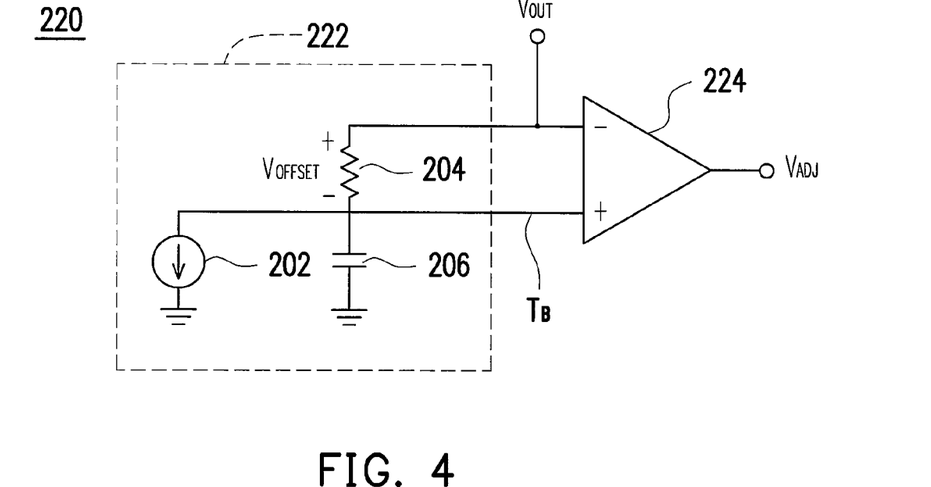
FIG. 4 is a schematic diagram illustrating a transient boost circuit according to an embodiment of the invention.
Figure 5:
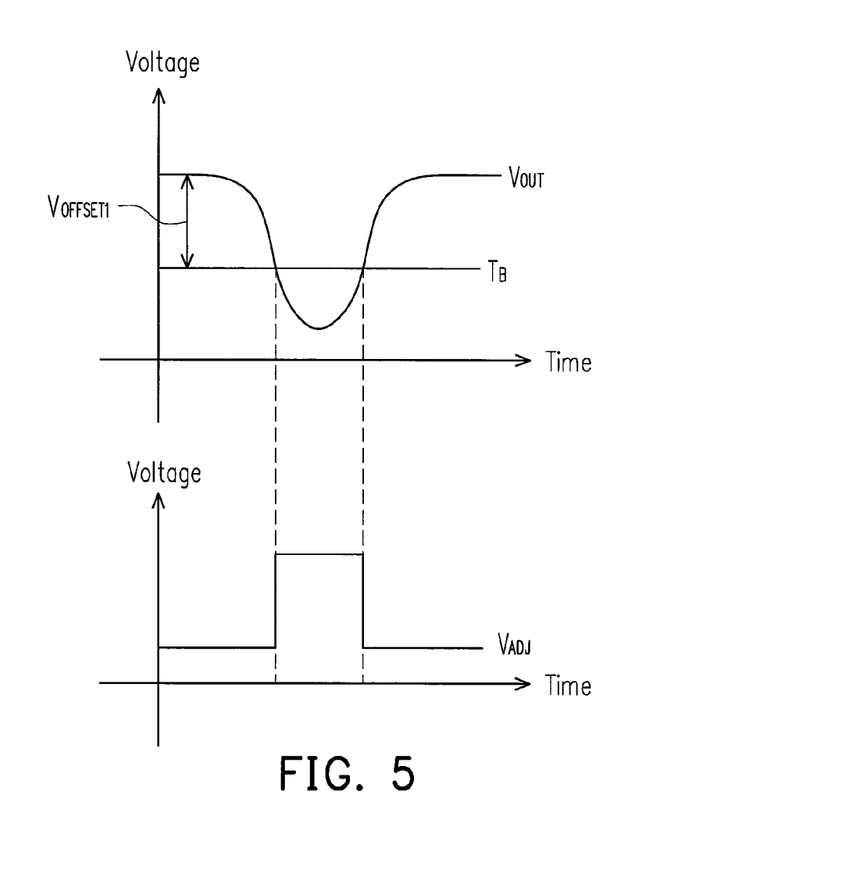
FIG. 5 is a schematic diagram illustrating a waveform of a transient boost circuit according to an embodiment of the invention.

FIG. 4 is a schematic diagram illustrating a transient boost circuit 220 according to an embodiment of the invention. Referring to FIG. 4, the compensation adjustment circuit 222 may include a current source 202, a resistor 204 and a capacitor 206. An inputted compensation voltage $V_{OFFSET}$ between the output voltage $V_{OUT}$ and the transient boost voltage $T_B$ is determined by the resistance of the resistor 204 and the current generated by the current source 202. The resistor 204 and the capacitor 206 together form a low pass filter (LPF) to stabilize the transient boost voltage $T_B$, so that the steady compensation voltage $V_{OFFSET}$ corresponding to the input voltage $V_{DD}$ may be utilized to correct the transient boost voltage $T_B$. Referring to FIG. 5, the output voltage $V_{OUT}$ is initially maintained at a steady state when the load connected to the DC-DC converter 200 is unchanged, and the transient boost circuit 220 has the transient boost voltage $T_B$ corresponding to the compensation voltage $V_{OFFSET}$ of the input voltage $V_{DD}$. When the output voltage $V_{OUT}$ drops due to the current load, the transient boost voltage $T_B$ may not respond immediately because of the LPF. Therefore, if the output voltage $V_{OUT}$ drops to lower than the transient boost voltage $T_B$, the comparator 224 generates a logic high level signal to serve as the adjusting signal $V_{ADJ}$. Contrarily, if the output voltage $V_{OUT}$ becomes higher than the transient boost voltage $T_B$, the comparator 224 generates a logic low level signal to serve as the adjusting signal $V_{ADJ}$. The positive pulse of the adjusting signal $V_{ADJ}$ forces the metal oxide semiconductor transistors 276 to turn on, so as to pull up the output voltage $V_{OUT}$ to supply more current to the load. One of the advantages in the embodiment is that the transient boost circuit 220 has a quicker response to the current load event than to the PWM signal $S_{PWM1}$, which is because the error signal $V_{COMP}$ varies along with the output voltage $V_{OUT}$ (that has a time delay).

Figure 6:
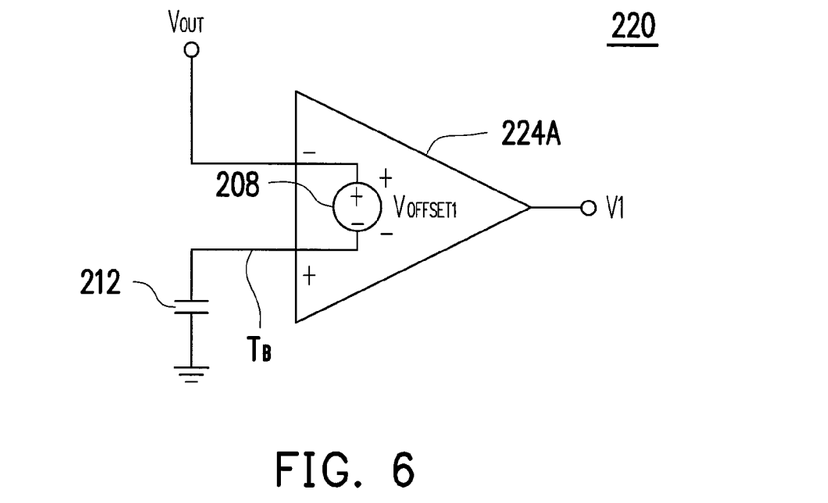
FIG. 6 is a schematic diagram illustrating a transient boost circuit according to another embodiment of the invention.

FIG. 6 is a schematic diagram illustrating a transient boost circuit 220 according to another embodiment of the invention. Referring to FIG. 6, the comparator 224A may execute the operation of compensation adjustment. The comparator 224A includes a compensation voltage source 208 and a capacitor 212 inside, in which the compensation voltage source 208 is usually located between the inputted output voltage $V_{OUT}$ and the inputted transient boost voltage $T_B$ so as to supply an inputted compensation voltage $V_{OFFSET1}$, and the capacitor 212 is usually configured to stabilize the transient boost voltage $T_B$. For the compensation voltage source 208 being executed inside the comparator 224A, the size of the input stage transistor in the comparator 224A may be fabricated to be mismatched so as to generate an input compensation. For instance, the compensation voltage may be set to 100~200 mV, in which the compensation value may be determined according to the actual executed design rule.

Referring to FIG. 3 again, the dash line depicted in FIG. 3 is the waveform under the conventional structure depicted in FIG. 1, and the solid line is the waveform under the structure of the embodiment of the invention. The triangle-wave under the constant frequency structure occurs periodically, and when the adjusting signal $V_{ADJ}$ is generated, it indicates the transient of the output voltage $V_{OUT}$ occurs. The combination logic circuit 230 rapidly pulls the ram signal $V_{RAMP}$ to zero (or pulls down to the lowest) and maintains over the predetermined time t1. Therefore, during the predetermined time t1, the solid line for the ramp signal is zero, and the error signal $V_{COMP}$ is regardlessly higher than the ram signal $V_{RAMP}$. The PWM signal $S_{PWM1}$ generated by the PWM generator 260 depicted in FIG. 2 during such duration is capable of extending the time being at logic high level, which resulting in a quicker transient response. When the adjusting signal $V_{ADJ}$ is returned to the logic low level, the PWM generator 260 generates the PWM waveform of the normal pulse.

Based on the above, the PWM signal $S_{PWM2}$ depicted in FIG. 3 is a waveform for comparison, and the PWM signal $S_{PWM2}$ is the output of the logic circuit 120 depicted in FIG. 1. The PWM signal $S_{PWM1}$ of the embodiment in the invention may maintain at the logic high level over a longer duration during the transient occurs, such that the DC-DC converter 200 is capable of supplying more current to the load.

Figure 7:
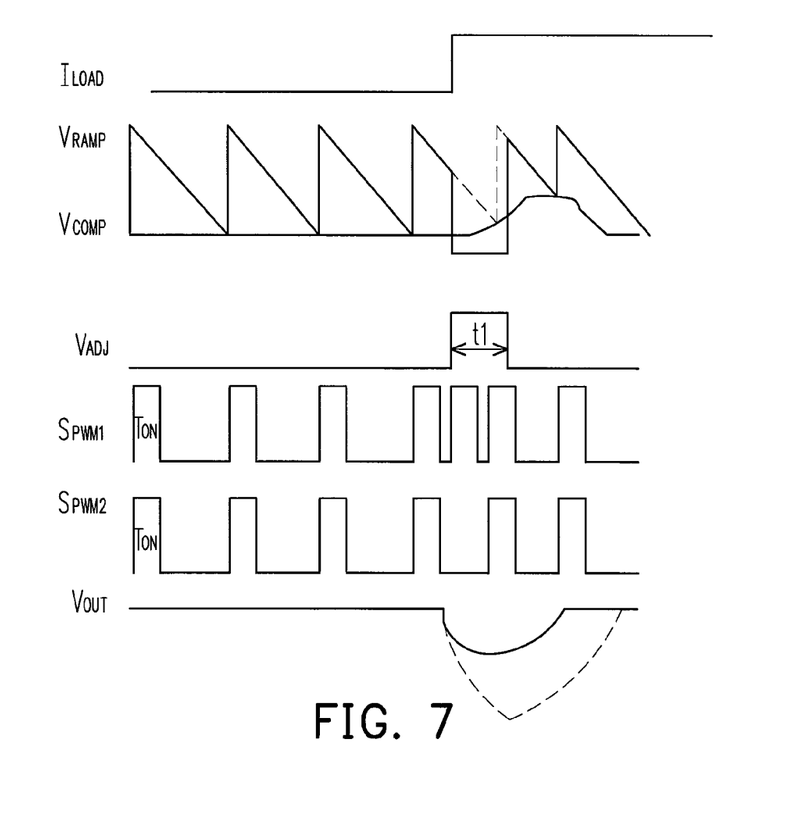
FIG. 7 is a schematic diagram illustrating waveforms under a constant on time (COT) structure according to an embodiment of the invention.

FIG. 7 is a schematic diagram illustrating waveforms under a constant on time (COT) structure according to an embodiment of the invention. Referring to FIG. 7, the waveform of the ramp signal $V_{RAMP}$ here is an inverted triangle as compared to the waveform depicted in FIG. 3. The DC-DC converter 200 is applied under the COT structure, so that when a load current $I_{LOAD}$ is increased, namely, the transient boost voltage $T_B$ occurs, the positive pulse of the adjusting signal $V_{ADJ}$ is generated. The combination logic circuit 230 may rapidly pull the ramp signal $V_{RAMP}$ to the lowest of the waveform and maintains over a fixed predetermined time t1. During the duration being pulled to the lowest of the waveform, the comparator 250 may obtain that the error signal $V_{COMP}$ is higher than the ramp signal $V_{RAMP}$ according to the comparison of the two signals, and may cause the PWM generator 260 to continuously generate the PWM signal $S_{PWM1}$ with the PWM pulse. In the embodiment, as compared to the conventional PWM signal $S_{PWM1}$, there is an additional PWM pulse existed during the transient period. Moreover, the on-time $T_{ON}$ for each of the PWM pulses being at high level is fixed, and is at least separated by one of the minimum off-times, instead of directly extending the time being at logic high level (as shown in FIG. 3).

Furthermore, as compared to the conventional techniques, the PWM signal $S_{PWM1}$ depicted in FIG. 7 may maintain at the logic high level over a longer duration during the transient occurs, such that the DC-DC converter 200 being applied under the COT structure is capable of supplying more current to the load.

Figure 8:
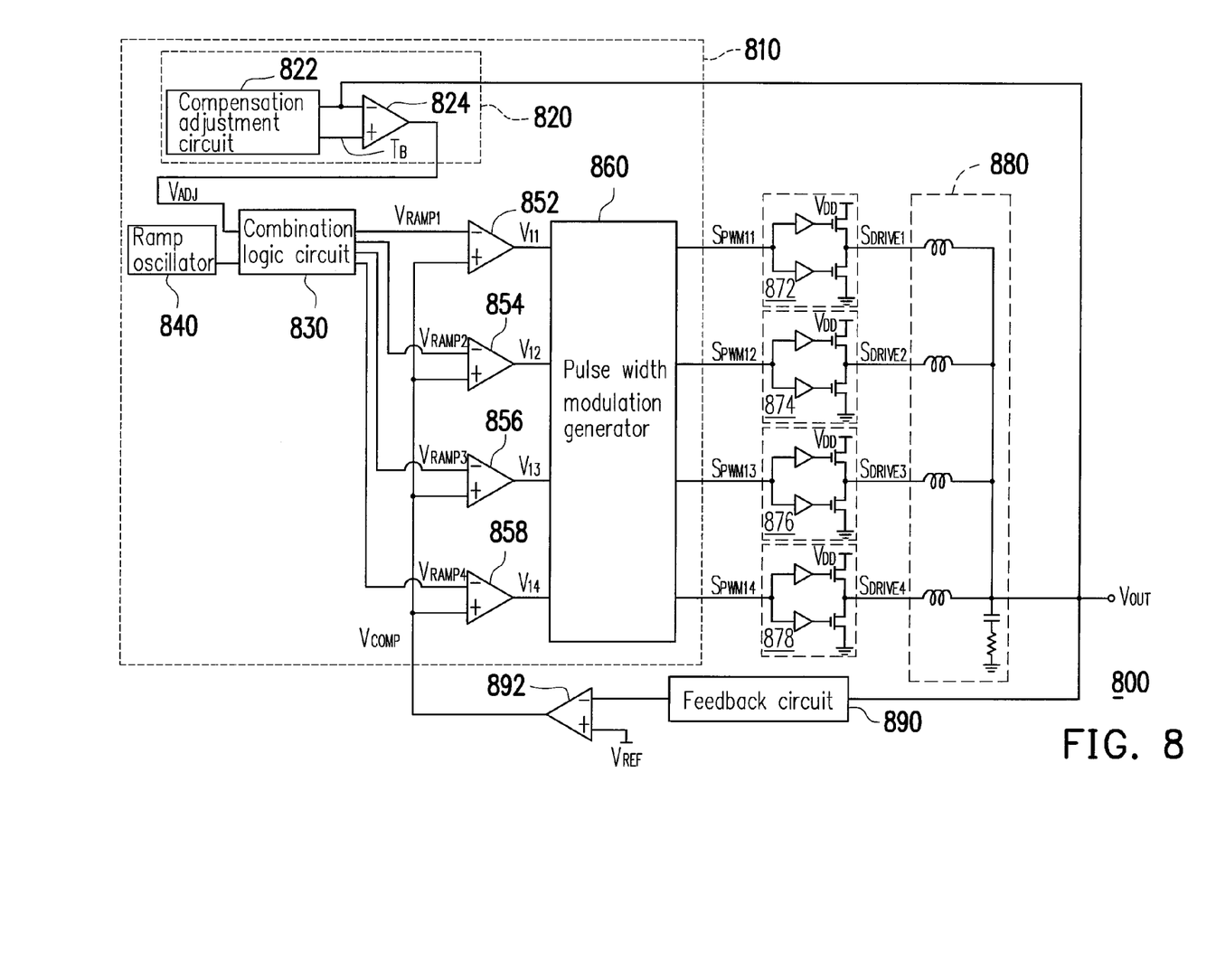
FIG. 8 is a schematic diagram illustrating a multi-phase DC-DC converter according to an embodiment of the invention.

FIG. 8 is a schematic diagram illustrating a multi-phase DC-DC converter according to an embodiment of the invention. Referring to FIG. 8, the structure and the operation of the multi-phase DC-DC converter 800 are similar to the DC-DC converter 200 depicted in FIG. 2. The DC-DC converter 800 includes a DC-DC controller 810, a plurality of output stages 872~878, a buck circuit 880, a feedback circuit 890, an error amplifier 892. The DC-DC converter 800 is applicable to convert the input voltages $V_{DD}$ to the output voltage $V_{OUT}$ by the multi-phase channels, in which the output of each of the output stages is equivalent to a single-phase channel, and the outputs of the plurality of output stages form the multi-phase channels. Moreover, the DC-DC controller 810 includes a transient boost circuit 820, a combination logic circuit 830, a ramp oscillator 840, a plurality of comparators 852~858 and a PWM generator 860.

The combination logic circuit 830 is coupled to the transient boost circuit 820 and the ramp oscillator 840. The comparators 852~858 are coupled to the combination logic circuit 830 and the PWM generator 860. The output stages 872~878 are coupled to the PWM generator 860. The buck circuit 880 is coupled to the outputs of the output stages 872~878.

The feedback circuit 890 may include a plurality of resistors (not shown), the resistors are configured to divide the output voltage $V_{OUT}$, and to generate the feedback voltage $V_{FB}$. The error amplifier 892 receives the feedback voltage $V_{FB}$ and the reference voltage $V_{REF}$ to generate the error signal $V_{COMP}$ related to the output voltage $V_{OUT}$. The operating principle of the transient boost circuit 820 is the same as the transient boost circuit 220 depicted in FIG. 2, which may generate the adjusting signal $V_{ADJ}$ according to a variation of the output voltage $V_{OUT}$. The transient boost circuit 820 includes the compensation adjustment circuit 822 and the comparator 824. The compensation adjustment circuit 822 receives the output voltage $V_{OUT}$, and then generates a transient boost voltage $T_B$, in which such voltage has a compensation voltage corresponding to the output voltage $V_{OUT}$. The comparator 824 receives the output voltage $V_{OUT}$ at a first terminal and receives the transient boost voltage $T_B$ at a second terminal, and compares the output voltage $V_{OUT}$ and the transient boost voltage $T_B$ to generate the adjusting signal $V_{ADJ}$.

The combination logic circuit 830 provides a plurality of ramp signals $V_{RAMP1}$~$V_{RAMP4}$ to the first terminals corresponding to the first comparators 852~858 according to the adjusting signal $V_{ADJ}$ and an output of the ramp oscillator 840. The second terminal of each of the comparators 852~858 receives the error signal $V_{COMP}$ related to the output voltage $V_{OUT}$. Each of the comparators 852~858 respectively generates the first signal (i.e., $V_{11}$~$V_{14}$) according to the error signal $V_{COMP}$ related to the output voltage $V_{OUT}$ and one of the corresponding ramp signals $V_{RAMP1}$~$V_{RAMP4}$. The PWM generator 860 generates a plurality of PWM signals $S_{PWM11}$~$S_{PWM14}$ according to the first signals $V_{11}$~$V_{14}$. The output stages 872~878 convert the input voltages $V_{DD}$ to the driving signals $S_{DRIVE1}$~$S_{DRIVE4}$ by the multiple channels according to the PWM signals $S_{PWM11}$~$S_{PWM14}$. Subsequently, the buck circuit 880 outputs the energies to the load terminal according to the driving signals $S_{DRIVE1}$~$S_{DRIVE4}$, so as to generate the full amount of the output voltage $V_{OUT}$.

It is noted that four of the first comparators 852~858 are employed in the embodiment of FIG. 8 and followed by generating four PWM signals $S_{PWM11}$~$S_{PWM14}$ with the PWM phase. The multi-phase DC-DC converter is taken as an example for illustration purpose. The number of multi-phase may be varied such as eight phases or sixteen phases without being limited to four phases, where the number can be determined depending upon the actual design requirement, although the invention is not limited thereto.

Figure 9:
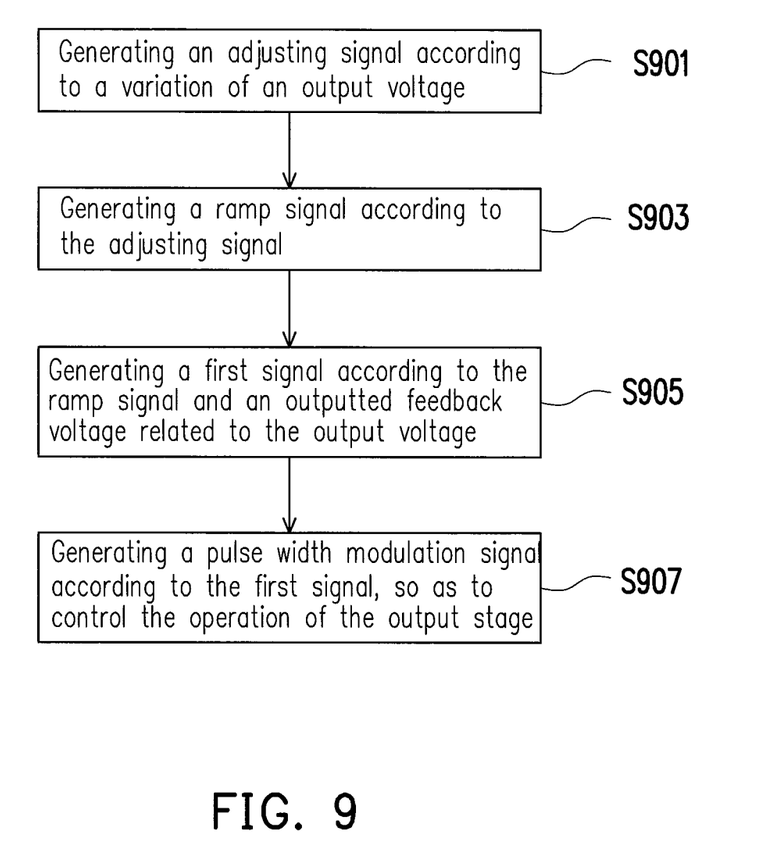
FIG. 9 is a flowchart diagram illustrating a DC-DC control method according to an embodiment of the invention.

Based on the foregoing description of the embodiments, a generic DC-DC control method may be summarized. To be specific, FIG. 9 is a flowchart diagram illustrating a DC-DC control method according to an embodiment of the invention. Referring to FIG. 2 and FIG. 9 together for being convenient to illustrate, the DC-DC control method of the embodiment may include the following steps:

As shown in step S901, generating an adjusting signal $V_{ADJ}$ according to a variation of an output voltage $V_{OUT}$.

Next, as shown in step S903, generating a ramp signal $V_{RAMP}$ according to the adjusting signal $V_{ADJ}$.

Subsequently, as shown in step S905, generating a first signal $V_1$ according to the ramp signal $V_{RAMP}$ and the outputted feedback voltage related to the output voltage (such as an error signal $V_{COMP}$).

Then, as shown in step S907, generating a PWM signal $S_{PWM1}$ according to the first signal $V_1$, so as to control the operation of the output stage 270.

In addition, the method of executing step S901 may be described in detail as follows: receiving the output voltage $V_{OUT}$ to generate a transient boost voltage $T_B$, in which the transient boost voltage $T_B$ has a voltage compensation corresponding to a steady state of the output voltage $V_{OUT}$; and comparing the output voltage $V_{OUT}$ and the transient boost voltage $T_B$ to generate the adjusting signal $V_{ADJ}$.

In addition, when the transient boost voltage $T_B$ is higher than the output voltage $V_{OUT}$, the adjusting signal $V_{ADJ}$ has a logic high level, and when the transient boost voltage $T_B$ is lower than the output voltage $V_{OUT}$, the adjusting signal $V_{ADJ}$ has a logic low level. Furthermore, when the adjusting signal $V_{ADJ}$ has the logic high level, the ramp signal $V_{RAMP}$ is capable of being maintained at a first predetermined level, in which the first predetermined level has to be lower than a level of the error signal $V_{COMP}$ related to the output voltage $V_{OUT}$.

In view of the foregoing, in the embodiments of the invention, because of employing the detected transient variation of the output voltage to generate the adjusting signal, the combination logic circuit provides the ramp signal according to the adjusting signal and the output of the ramp oscillator. When the adjusting signal has the logic high level, the combination logic circuit maintains the ramp signal at the first predetermined level, in which the first predetermined level is lower than the level of the error signal related to the output voltage (such as, pulling the ramp signal rapidly to zero) and is maintained over a predetermined time. After the predetermined time, when the adjusting signal is returned to the logic low level, the ramp signal is then generated periodically. Thus, the invention is capable of enhancing the transient response and providing the current rapidly. On the other hand, the impact on the closed-loop control of the feedback circuit through the conventional open-loop method can also be avoided, and the integrity of the single-loop control can be maintained.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A direct current (DC)-DC controller coupled to an output stage where the output stage receives an input voltage and provides an output voltage, the DC-DC controller comprising:
 a transient boost circuit, generating an adjusting signal according to a variation of the output voltage;
 a ramp oscillator;
 a combination logic circuit, coupled to the transient boost circuit and the ramp oscillator, and providing a ramp signal according to the adjusting signal and an output of the ramp oscillator, wherein when the adjusting signal has a first logic level, the combination logic circuit adjusts the ramp signal so that the ramp signal is maintained at a first predetermined level for a predetermined time, wherein the first predetermined level is lower than a level of an error signal related to the output voltage;
 a first comparator, coupled to the combination logic circuit, and generating a first signal according to the error signal and the ramp signal; and
 a pulse width modulation (PWM) generator, coupled to the first comparator, and generating a PWM signal to control the operation of the output stage according to the first signal.

2. The DC-DC controller according to claim 1, wherein the transient boost circuit comprises:
 a compensation adjustment circuit, receiving the output voltage to generate a transient boost voltage, wherein the transient boost voltage has a voltage compensation corresponding to a steady state of the output voltage; and
 a second comparator, comparing the output voltage and the transient boost voltage to generate the adjusting signal.

3. The DC-DC controller according to claim 2, wherein when the transient boost voltage is higher than the output voltage, the adjusting signal has the first logic level, and when the transient boost voltage is lower than the output voltage, the adjusting signal has a second logic level.

4. The DC-DC controller according to claim 3, wherein when the adjusting signal has the second logic level, the combination logic circuit maintains the ramp signal, so that the ramp signal provided by the ramp oscillator is provided to the first comparator.

5. The DC-DC controller according to claim 2, wherein the compensation adjustment circuit comprises:
 a first capacitor, coupled to a first input terminal of the second comparator, and configured to maintain the transient boost voltage;
 a current source, coupled to the first input terminal of the second comparator, and configured to generate a current; and
 a resistor, coupled between the first input terminal and a second input terminal of the second comparator, and configured to generate the voltage compensation.

6. The DC-DC controller according to claim 5, wherein the resistance of the resistor is multiplied by the current so as to generate the voltage compensation.

7. The DC-DC controller according to claim 1, wherein the transient boost circuit comprises:
 a second capacitor, configured to maintain a transient boost voltage; and
 a third comparator, having a first input terminal coupled to the output voltage and a second input terminal coupled to the second capacitor, and having a compensation voltage source between the first input terminal and the second input terminal of the third comparator, and the third comparator compares the output voltage and the transient boost voltage to generate the adjusting signal.

8. The DC-DC controller according to claim 7, wherein when the transient boost voltage is higher than the output voltage, the adjusting signal has the first logic level, and when the transient boost voltage is lower than the output voltage, the adjusting signal has a second logic level.

9. A DC-DC control method, configured to employ an output stage to provide an output voltage after receiving an input voltage, the DC-DC control method comprising:
 generating an adjusting signal according to a variation of the output voltage;
 providing a ramp signal according to the adjusting signal and an output of a ramp oscillator;
 when the adjusting signal has a first logic level, maintaining the ramp signal at a first predetermined level for a predetermined time, wherein the first predetermined level is lower than a level of an error signal related to the output voltage;
 generating a first signal according to the error signal and the ramp signal; and
 generating a PWM signal to control the operation of the output stage according to the first signal.

10. The DC-DC control method according to claim 9, wherein the step of generating the adjusting signal according to the variation of the output voltage further comprises:
 receiving the output voltage to generate a transient boost voltage, wherein the transient boost voltage has a voltage compensation corresponding to a steady state of the output voltage; and
 comparing the output voltage and the transient boost voltage to generate the adjusting signal.

11. The DC-DC control method according to claim 10, wherein when the transient boost voltage is higher than the output voltage, the adjusting signal has the first logic level, and when the transient boost voltage is lower than the output voltage, the adjusting signal has a second logic level.

12. The DC-DC control method according to claim 11, wherein when the adjusting signal has the second logic level, the ramp signal is maintained and outputted.

13. A direct current (DC)-DC controller coupled to an output stage where the output stage receives an input voltage and provides an output voltage, the DC-DC controller comprising:
 a transient boost circuit, generating an adjusting signal having a logic level according to a variation of the output voltage;
 a ramp oscillator;
 a combination logic circuit, coupled to the transient boost circuit and the ramp oscillator, and providing a ramp signal according to the adjusting signal and an output of the ramp oscillator, the combination logic circuit adjusting a level of the ramp signal according to the logic level of the adjusting signal, wherein when the adjusting signal has the first logic level, the combination logic circuit adjusts the ramp signal so that the ramp signal is maintained at a first predetermined level for a predetermined time, wherein the first predetermined level is lower than a level of an error signal related to the output voltage;
 a first comparator, coupled to the combination logic circuit, and generating a first signal according to an error signal and the ramp signal; and
 a pulse width modulation (PWM) generator, coupled to the first comparator, and generating a PWM signal to control the operation of the output stage according to the first signal.

14. The DC-DC controller according to claim 13, wherein the transient boost circuit comprises:

a compensation adjustment circuit, receiving the output voltage to generate a transient boost voltage, wherein the transient boost voltage has a voltage compensation corresponding to a steady state of the output voltage; and a second comparator, comparing the output voltage and the transient boost voltage to generate the adjusting signal.

15. The DC-DC controller according to claim 14, wherein when the transient boost voltage is higher than the output voltage, the adjusting signal has a first logic level, and when the transient boost voltage is lower than the output voltage, the adjusting signal has a second logic level.

16. The DC-DC controller according to claim 15, wherein when the adjusting signal has the second logic level, the combination logic circuit outputs the ramp signal of the ramp oscillator.

17. A DC-DC control method, configured to employ an output stage to provide an output voltage after receiving an input voltage, the DC-DC control method comprising:

generating an adjusting signal according to a variation of the output voltage;

providing a ramp signal according to a logic level of the adjusting signal and an output of a ramp oscillator, wherein when the adjusting signal has the first logic level, the step of providing the ramp signal according to the logic level of the adjusting signal and the output of the ramp oscillator further comprises:

maintaining the ramp signal at a first predetermined level for a predetermined time, wherein the first predetermined level is lower than a level of an error signal related to the output voltage;

generating a first signal according to an error signal and the ramp signal; and generating a PWM signal to control the operation of the output stage according to the first signal.

18. The DC-DC control method according to claim 17, wherein the step of generating the adjusting signal according to the variation of the output voltage further comprises:

receiving the output voltage to generate a transient boost voltage, wherein the transient boost voltage has a voltage compensation corresponding to a steady state of the output voltage; and comparing the output voltage and the transient boost voltage to generate the adjusting signal.

19. The DC-DC control method according to claim 18, wherein when the transient boost voltage is higher than the output voltage, the adjusting signal has a first logic level, and when the transient boost voltage is lower than the output voltage, the adjusting signal has a second logic level.

20. The DC-DC control method according to claim 19, wherein when the adjusting signal has second logic level, the step of generating the ramp signal according to the logic level of the adjusting signal further comprises:

outputting the ramp signal.

* * * * *